(12) United States Patent
Lee

(10) Patent No.: US 11,489,480 B2
(45) Date of Patent: Nov. 1, 2022

(54) APPARATUS FOR DRIVING MOTOR OF MOTOR DRIVEN POWER STEERING AND CONTROL METHOD THEREOF

(71) Applicant: HYUNDAI MOBIS CO., LTD., Seoul (KR)

(72) Inventor: Jin Woo Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 14 days.

(21) Appl. No.: 17/336,234

(22) Filed: Jun. 1, 2021

(65) Prior Publication Data

US 2021/0384862 A1 Dec. 9, 2021

(51) Int. Cl.
| | |
|---|---|
| *H02P 1/32* | (2006.01) |
| *H02P 3/20* | (2006.01) |
| *H02P 7/06* | (2006.01) |
| *H02P 29/028* | (2016.01) |
| *H02P 25/22* | (2006.01) |
| *B62D 5/04* | (2006.01) |
| *H02P 27/06* | (2006.01) |
| *B60R 16/023* | (2006.01) |

(52) U.S. Cl.
CPC .......... *H02P 29/028* (2013.01); *B62D 5/0463* (2013.01); *H02P 25/22* (2013.01); *H02P 27/06* (2013.01); *B60R 16/0231* (2013.01)

(58) Field of Classification Search
CPC ...... H02P 29/028; H02P 25/22; B62D 5/0463
USPC .......................................................... 318/496
See application file for complete search history.

(56) References Cited

U.S. PATENT DOCUMENTS

| | | | |
|---|---|---|---|
| 9,906,183 B1* | 2/2018 | Agirman | H02P 27/08 |
| 2019/0393801 A1* | 12/2019 | Agirman | H02P 27/08 |
| 2020/0313590 A1* | 10/2020 | Otake | H02M 7/53873 |
| 2021/0226574 A1* | 7/2021 | Kimura | H02P 29/028 |

FOREIGN PATENT DOCUMENTS

KR 2011-0007766 1/2011

* cited by examiner

*Primary Examiner* — Erick D Glass
(74) *Attorney, Agent, or Firm* — DLA Piper LLP (US)

(57) ABSTRACT

An apparatus for driving a motor of an MDPS may include: first to fourth driving power supply units configured to supply driving power to a driving motor; first to fourth inverters configured to switch the driving power supplied from the first to fourth driving power supply units, and supply the switched driving motor to the driving motor, in order to drive the driving motor; first to fourth driving units configured to drive the first to fourth inverters, respectively; a first control unit configured to operate the driving motor by switching the first and second inverters through the first and second driving units; a second control unit configured to operate the driving motor by switching the third and fourth inverters through the third and fourth driving units.

18 Claims, 2 Drawing Sheets

APPARATUS FOR DRIVING MOTOR OF MOTOR DRIVEN POWER STEERING AND CONTROL METHOD THEREOF

CROSS-REFERENCE TO RELATED APPLICATION

This application claims priority from and the benefit of Korean Patent Application No. 10-2020-0069502, filed on Jun. 9, 2020, which is hereby incorporated by reference for all purposes as if set forth herein.

BACKGROUND

Field

Exemplary embodiments of the present disclosure relate to an apparatus for driving a motor of an MDPS (Motor Driven Power Steering) and a control method thereof, and more particularly, to an apparatus for driving a motor of an MDPS, which employs dual platforms for driving the motor of the MDPS and a plurality of inverters for each of the platforms, thereby not only making better use of a space but also raising reliability, and a control method thereof.

Discussion of the Background

In general, a vehicle includes a steering system which includes a steering wheel installed at the front of a driver seat of the vehicle and a steering shaft connected to a rotating shaft of the steering wheel. As a driver turns the steering wheel, the rotating shaft of the steering wheel is rotated. Simultaneously, the steering shaft is rotated, and the front wheels of the vehicle are turned to the left/right, in order to switch the driving direction of the vehicle.

In such a steering system, the driver requires a large force to turn the steering wheel, when steering the vehicle by directly transferring a rotational force to the steering shaft, the rotational force being required for rotating the steering wheel.

Thus, in order to reduce a force required during a driver's steering operation, a hydraulic steering system using a hydraulic actuator to operate a steering wheel has been commercialized.

Recently, an MDPS is applied, which includes an electric actuator installed in a steering system of a vehicle. When a driver turns a steering wheel, the electric actuator is driven to turn the front wheels of the vehicle to the left/right, in order to control the driving direction of the vehicle.

Such an MDPS includes a torque sensor configured to measure steering torque of a driver, inputted to the steering wheel, a steering angle sensor configured to measure the steering angle of the steering wheel, and a vehicle speed sensor configured to measure vehicle speed. The MDPS determines the driving condition of the vehicle, and steers the vehicle while adjusting a current supplied to a driving actuator such as a motor.

The related art of the present disclosure is disclosed in Korean Patent Application Publication No. 2011-0007766 published on Jan. 25, 2011 and entitled "Motor Relay Control Apparatus and Method in MDPS".

Such an MDPS drives various actuators around an electric control unit. Thus, with the advent of the autonomous driving era, the demand for size reduction and reliability of an autonomous vehicle is increasing.

In particular, in order to improve the stability level of autonomous driving, the MDPS may be configured to have dual electronic control units. In this case, when a problem occurred in one platform, the MDPS may control the vehicle through the other platform.

However, when the motor of the MDPS is driven through the dual platform configuration, each platform needs to have a large capacity such that inverters of one platform can cover 100% power, when a problem occurs in the other platform. In this case, the volume of the MDPS and the size of a package are increased.

SUMMARY

Various embodiments are directed to an apparatus for driving a motor of an MDPS, which employs dual platforms for driving the motor of the MDPS and a plurality of inverters for each of the platforms, thereby not only making better use of a space but also raising reliability, and a control method thereof.

In an embodiment, an apparatus for driving a motor of an MDPS may include: a first driving power supply unit, a second driving power supply unit, a third driving power supply unit and a fourth driving power supply unit, which are configured to supply driving power to a driving motor; a first inverter, a second inverter, a third inverter and a fourth inverter, which are configured to switch the driving power supplied from the first to fourth driving power supply units, and supply the switched driving motor to the driving motor, in order to drive the driving motor; a first driving unit, a second driving unit, a third driving unit and a fourth driving unit, which are configured to drive the first to fourth inverters, respectively; a first control unit configured to operate the driving motor by switching the first and second inverters through the first and second driving units; a second control unit configured to operate the driving motor by switching the third and fourth inverters through the third and fourth driving units, wherein the first and second control units receive an operation state of the motor driving apparatus through communication between platforms, the first control unit not only controls the first and second driving units, but also controls any one or more of the third and fourth driving units, and the second control unit not only controls the third and fourth driving units, but also controls any one or more of the first and second driving units.

The communication between the platforms may be controller area network (CAN) communication.

The driving motor may include quadruple winding motors which are independently driven by the first to fourth inverters, respectively.

The first control unit may control any one or more of the third and third driving units when an abnormality occurred in the second control unit, and the second control unit may control any one or more of the first and second driving units when an abnormality occurred in the first control unit.

The first and second control units may control any one or more of the first to fourth inverters through any one or more of the first to fourth driving units, such that each of the first to fourth inverters has an equal amount of power.

The first control unit may shut down the control over any one or more of the third and fourth driving units by the second control unit, when controlling any one or more of the third and fourth driving units.

The second control unit may shut down the control over any one or more of the first and second driving units by the first control unit, when controlling any one or more of the first and second driving units.

When an abnormality occurred in any one or more of the first to fourth driving power supply units, the first and second control units may shut down the control over the inverter, that receives driving power from the driving power supply unit where the abnormality occurred, and raise the powers of the other inverters, through the first to fourth driving units.

When an abnormality occurred in any one or more of the first to fourth driving units, the first and second control units may shut down the control over the driving unit where the abnormality occurred, and raise the powers of the inverters through the other driving units.

In an embodiment, a control method of an apparatus for driving a motor of an MDPS may include: receiving, by a first control unit and a second control unit, an operation state of the motor driving apparatus; receiving, by the first and second control units, the operation state of the motor driving apparatus, and determining whether an abnormality occurred in the motor driving apparatus; shutting down, by the first and second control units, control over an inverter where the abnormality occurred, among a first inverter, a second inverter, a third inverter and a fourth inverter, when the determination result indicates that the abnormality occurred; and raising, by the first and second control units, powers of normal inverters among the first to fourth inverters.

The control method may further include controlling, by the first and second control units, the first to fourth inverters to have an equal amount of power, when the determination result indicates that no abnormality occurred.

In the receiving of the operation state of the motor driving apparatus, the first and second control units may receive the operation state of the motor driving apparatus through communication between platforms.

The communication between the platforms may be CAN communication.

The first control unit may not only control a first driving unit and a second driving unit, but also control any one or more of a third driving unit and a fourth driving unit, and the second control unit may not only control the third and fourth driving units, but also control any one or more of the first and second driving units.

The first control unit may control any one or more of the third and third driving units when an abnormality occurred in the second control unit, and the second control unit may control any one or more of the first and second driving units when an abnormality occurred in the first control unit.

The first control unit may shut down the control over any one or more of the third and fourth driving units by the second control unit, when controlling any one or more of the third and fourth driving units.

The second control unit may shut down the control over any one or more of the first and second driving units by the first control unit, when controlling any one or more of the first and second driving units.

In the shutting down of the control over the inverter where the abnormality occurred, when an abnormality occurred in any one or more of the first to fourth driving power supply units, the first and second control units may shut down the control over the inverter, that receives driving power from the driving power supply unit where the abnormality occurred, among the first to fourth inverters, and raise the powers of the other inverters, through the first to fourth driving units.

In the shutting down of the control over the inverter where the abnormality occurred, when an abnormality occurred in any one or more of the first to fourth driving units to drive the first to fourth inverters, respectively, the first and second control units may disable the driving unit where the abnormality occurred, and raise the powers of the inverters through the other driving units.

In the apparatus for driving a motor of an MDPS and the control method thereof in accordance with the embodiments of the present disclosure, dual platforms for driving the motor of the MDPS and the plurality of inverters for each of the platforms may be employed. Thus, the sizes of the elements may be reduced to make better use of a space. Furthermore, during breakdown switching, instantaneous damage may be reduced to raise the reliability of the apparatus.

DETAILED DESCRIPTION OF THE ILLUSTRATED EMBODIMENTS

Figure 1:
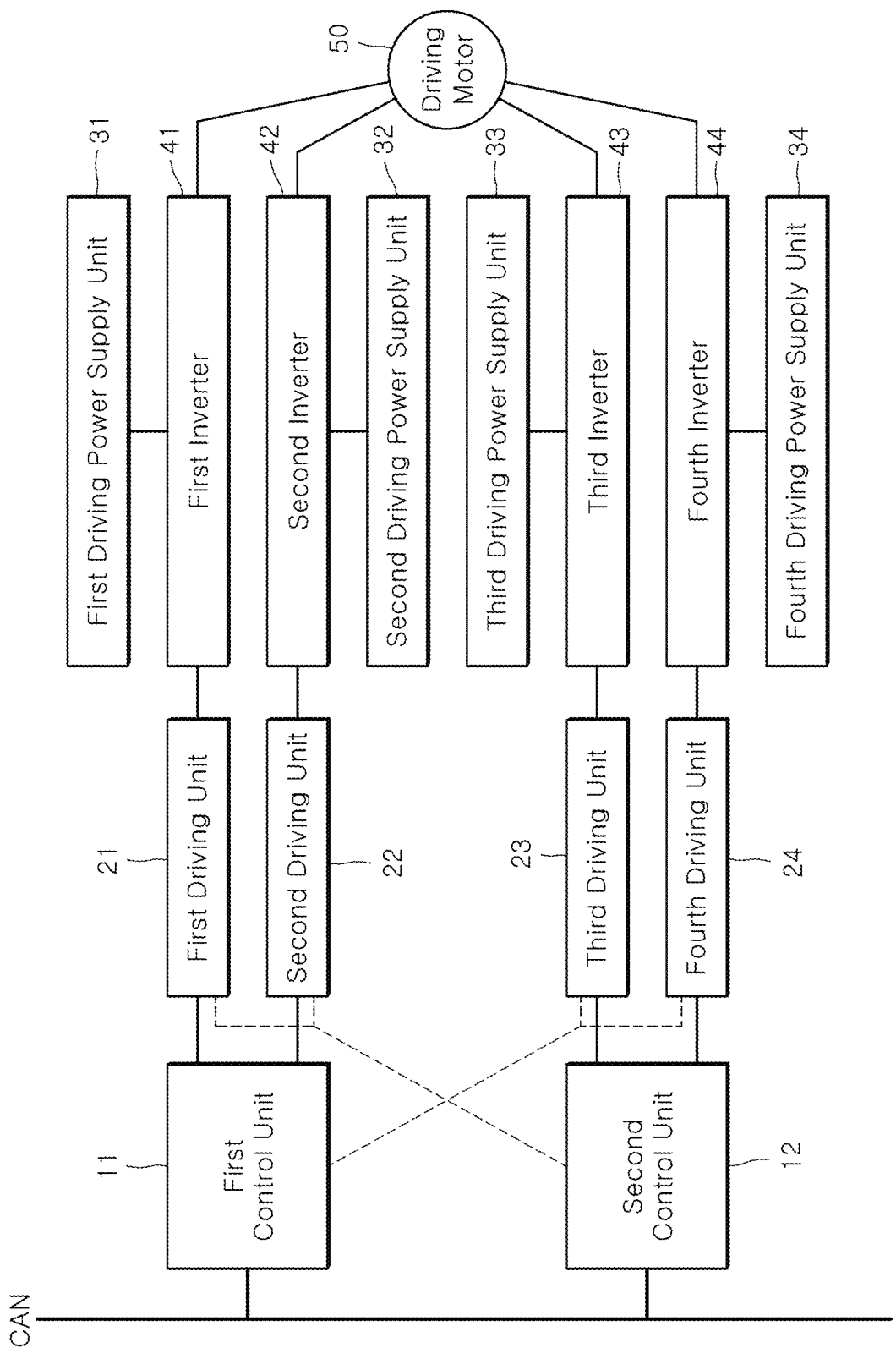
FIG. 1 is a block configuration diagram illustrating an apparatus for driving a motor of an MDPS in accordance with an embodiment of the present disclosure.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an apparatus for driving a motor of an MDPS and a control method thereof will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

FIG. 1 is a block configuration diagram illustrating an apparatus for driving a motor of an MDPS in accordance with an embodiment of the present disclosure.

As illustrated in FIG. 1, the apparatus for driving a motor of an MDPS in accordance with the embodiment of the present disclosure includes first to fourth driving power supply units 31 to 34, first to fourth inverters 41 to 44, first to fourth driving units 21 to 24 and first and second control units 11 and 12.

The first to fourth driving power supply units 31 to 34 may individually supply driving power to a driving motor 50 through the first to fourth inverters 41 to 44. Thus, although an abnormality occurs in any one of the first to fourth driving power supply units 31 to 34, the driving power may be supplied through the other driving power supply units, in order to supply 100% power.

The first to fourth inverters 41 to 44 may switch the driving power supplied from the first to fourth driving power supply units 31 to 34, and supply the switched driving power to the driving motor 50, thereby driving the driving motor 50.

The first to fourth inverters 41 to 44 may be each configured as an inverter having such a size that can cover 25% of the entire power in a normal state, and cover 33.4% of the entire power when an abnormality occurs in any one of the first to fourth inverters 41 to 44. Thus, when an abnormality occurs in any one of the first to fourth inverters 41 to 44, three inverters cover the entire power.

The first to fourth inverters 41 to 44 may each include a phase switch and a cut-off switch. The phase switch may convert DC driving power into three-phase power, and the cut-off switch may completely cut off the three-phase power when a breakdown occurred.

At this time, the phase switch and the cut-off switch may be each configured as a power semiconductor element such as a MOSFET (Metal-Oxide-Semiconductor Field-Effect Transistor) or IGBT (Insulated Gate Bipolar Transistor).

Therefore, according to power that can be covered by the first to fourth inverters 41 to 44, the size of the power semiconductor element may be significantly reduced.

The first to fourth driving units 21 to 24 may change the frequency of the three-phase power by driving the first to fourth inverters 41 to 44, respectively, according to control signals generated by the first and second control units 11 and 12, thereby adjusting the speed and torque of the driving motor 50.

The first to fourth driving units 21 to 24 may drive the first to fourth inverters 41 to 44 to each cover 25% of the entire power in a normal state, and to each cover 33.4% of the entire power when the control over any one of the first to fourth inverters 41 to 44 is shut down. Thus, the entire power can be covered by the other inverters, and outputted at 100%.

The first control unit 11 may receive the operation state of the motor driving apparatus through communication between platforms, convert the DC driving power into three-phase power by switching the first and second inverters 41 and 42 through the first and second driving units 21 and 22, and change the frequency of the three-phase power to operate the driving motor 50.

The second control unit 12 may receive the operation state of the motor driving apparatus through communication between the platforms, convert the DC driving power into three-phase power by switching the third and fourth inverters 43 and 44 through the third and fourth driving units 23 and 24, and change the frequency of the three-phase power to operate the driving motor 50.

The first control unit 11 may not only control the first and second driving units 21 and 22, but also control any one or more of the third and fourth driving units 23 and 24, and the second control unit 12 may not only control the third and fourth driving units 23 and 24, but also control any one or more of the first and second driving units 21 and 22.

At this time, when controlling any one or more of the third and fourth driving units 23 and 24, the first control unit 11 may shut down the control over any one or more of the third and fourth driving units 23 and 24 by the second control unit 12. Furthermore, when controlling any one or more of the first and second driving units 21 and 22, the second control unit 12 may shut down the control over any one or more of the first and second driving units 21 and 22 by the first control unit 11.

The communication between the platforms, through which the first and second control units 11 and 12 receive the operation state of the motor driving apparatus, may include CAN communication.

Furthermore, the driving motor 50 may serve as a driving actuator of the MDPS to steer the vehicle by substantially rotating a steering wheel (not illustrated), and quadruple winding motors may be employed as the driving motor 50, the quadruple winding motors being independently driven by the first to fourth inverters 41 to 44, respectively, even though the quadruple winding motors output one power.

Therefore, the first control unit 11 may receive the operation state of the motor driving apparatus, and control any one or more of the third and fourth driving units 23 and 24 when an abnormality occurred in the second control unit 12, and the second control unit 12 may control any one or more of the first and second driving units 21 and 22 when an abnormality occurred in the first control unit 11. Thus, although an abnormality occurs in any one of the first and second control units 11 and 12, the driving motor 50 may be normally driven through the other control unit.

At this time, the first and second control units 11 and 12 may control one or more of the first to fourth inverters 41 to 44 through one or more of the first to fourth driving units 21 to 24, such that each of the first to fourth inverters 41 to 44 covers an equal amount of power. Thus, even though an abnormality occurs, the first and second control units 11 and 12 may raise the powers of the inverters in a normal state such that the entire power becomes 100%.

Furthermore, the first and second control units 11 and 12 may receive the operation state of the motor driving apparatus. When an abnormality occurred in any one or more of the first to fourth driving power supply units 31 to 34, the first and second control units 11 and 12 may shut down the control over an inverter that receives driving power from the driving power supply unit where the abnormality occurred, among the first to fourth inverters 41 to 44, and raise the powers of the other inverters in a normal state, through the first to fourth driving units 21 to 24.

When an abnormality occurred in any one or more of the first to fourth driving units 21 to 24 which drive the first to fourth inverters 41 to 44, respectively, the first and second control units 11 and 12 may shut down the control over the driving unit where the abnormality occurred, and raise the powers of the inverters through the other driving units in a normal state.

As described above, the apparatus for driving a motor of an MDPS in accordance with the embodiment of the present disclosure may employ dual platforms for driving the motor of the MDPS and the plurality of inverters for each of the platforms. Thus, the sizes of the elements may be reduced to make better use of a space. Furthermore, during breakdown switching, instantaneous damage may be reduced to raise the reliability of the apparatus.

Figure 2:
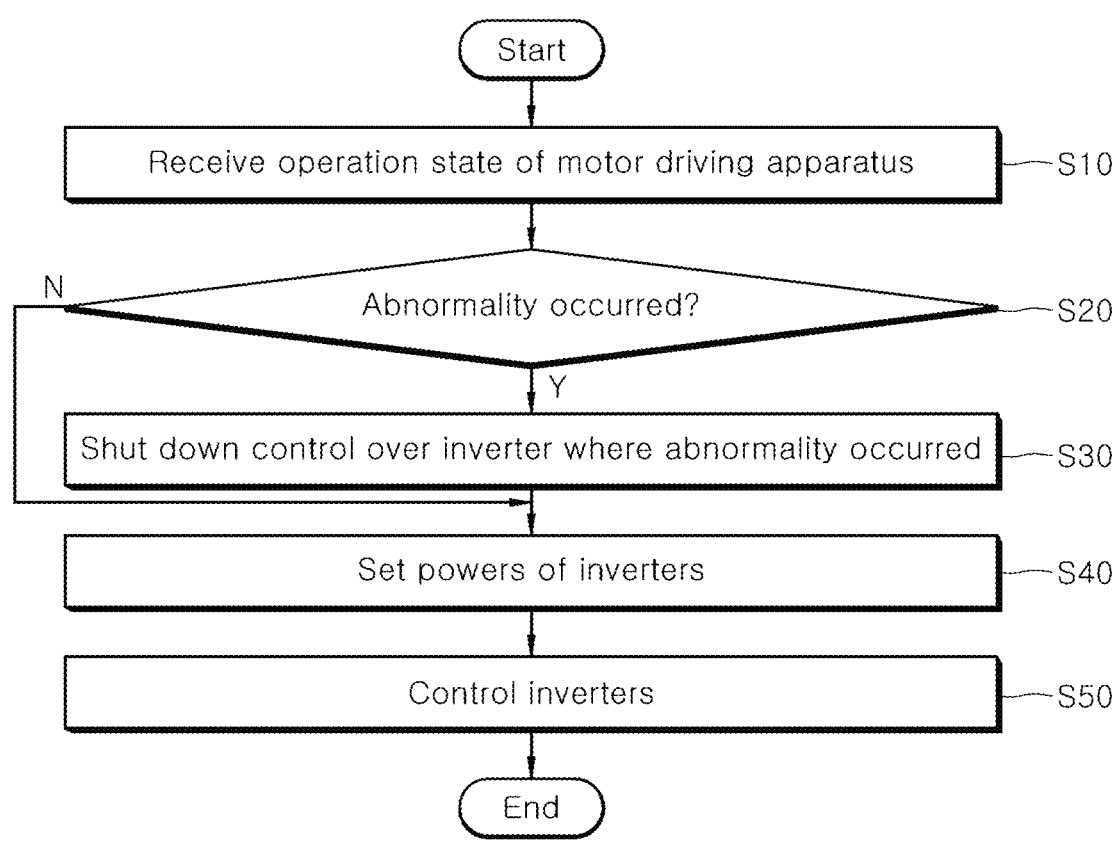
FIG. 2 is a flowchart for describing a control method of an apparatus for driving a motor of an MDPS in accordance with an embodiment of the present disclosure.

FIG. 2 is a flowchart for describing a control method of an apparatus for driving a motor of an MDPS in accordance with an embodiment of the present disclosure.

As illustrated in FIG. 2, the control method of the apparatus for driving a motor of an MDPS in accordance with the embodiment of the present disclosure starts with step S10 in which the first and second control units 11 and 12 receive an operation state of the motor driving apparatus.

The first control unit 11 may not only control the first and second driving units 21 and 22, but also control any one or more of the third and fourth driving units 23 and 24, and the second unit 12 may not only control the third and fourth driving units 23 and 24, but also control any one or more of the first and second driving units 21 and 22.

At this time, when controlling any one or more of the third and fourth driving units 23 and 24, the first control unit 11 may shut down the control over any one or more of the third and fourth driving units 23 and 24 by the second control unit 12. Furthermore, when controlling any one or more of the first and second driving units 21 and 22, the second control unit 12 may shut down the control over any one or more of the first and second driving units 21 and 22 by the first control unit 11.

The communication between the platforms, through which the first and second control units 11 and 12 receive the operation state of the motor driving apparatus, may include CAN communication.

The first and second control units 11 and 12 having received the operation state of the motor driving apparatus in step S10 may check the operation states of the first and second control units 11 and 12, the first to fourth driving power supply units 31 to 34 and the first to fourth driving units 21 to 24, which are the motor driving apparatus, in order to determine whether an abnormality occurred, in step S20.

When the determination result of step S20 indicates that an abnormality occurred in the motor driving apparatus, the first and second control units 11 and 12 shut down the control over the inverter where the abnormality occurred, among the first to fourth inverters 41 to 44, in step S30.

For example, the first control unit 11 may shut down the control over any one or more of the third and fourth driving units 23 and 24 when an abnormality occurred in the second control unit 12, and the second control unit 12 may shut down the control over any one or more of the first and second driving units 21 and 22 when an abnormality occurred in the first control unit 11, in order to shut down the control over the inverter.

Furthermore, when an abnormality occurred in any one or more of the first to fourth driving power supply units 31 to 34, the first and second control units 11 and 12 may shut down the control over the inverter that receives driving power from the driving power supply unit where the abnormality occurred, among the first to fourth inverters 41 to 44, through the first to fourth driving units 21 to 24.

Furthermore, when an abnormality occurred in any one or more of the first to fourth driving units 21 to 24 which drive the first to fourth inverters 41 to 44, respectively, the first and second control units 11 and 12 may disable the driving unit where the abnormality occurred, in order to shut down the control over the corresponding inverter.

After shutting down the control over the inverter where the abnormality occurred in step S30, the first and second control units 11 and 12 may set the powers of the first to fourth inverters 41 to 44 such that each of the inverters which can be normally controlled, among the first to fourth inverters 41 to 44, has an equal amount of power, in step S40. Then, the first and second control units 11 and 12 may control the inverters to drive the driving motor 50 in step S50.

That is, after shutting down the control over the inverter where the abnormality occurred, the first and second control units 11 and 12 may control the inverters by raising the powers of the inverters which can be normally controlled, such that the driving motor 50 is driven at 100% power.

In the control method of the apparatus for driving a motor of an MDPS in accordance with the embodiment of the present disclosure, dual platforms for driving the motor of the MDPS and the plurality of inverters for each of the platforms may be employed. Thus, the sizes of the elements may be reduced to make better use of a space. Furthermore, during breakdown switching, instantaneous damage may be reduced to raise the reliability of the apparatus.

The embodiments described in this specification may be implemented with a method or process, a device, a software program, a data stream or a signal, for example. Although a feature is discussed only in a single context (for example, discussed only in a method), the discussed feature can be implemented in another type (for example, apparatus or program). An apparatus may be implemented in suitable hardware, software or firmware. The method can be implemented in a device such as a processor which generally refers to a processing device including a computer, a microprocessor, an integrated circuit or a programmable logic device. The processor also includes a communication device, such as a computer, cellular phone, PDA (Personal Digital Assistant) and another device, which facilitates information communication between end users.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for driving a motor of a Motor Driven Power Steering (MDPS), comprising:
a first driving power supply unit configured to supply driving power, a first inverter configured to switch the driving power supplied by the first driving power supply unit and thereby drive the motor, and a first driving unit configured to drive the first inverter;
a second driving power supply unit configured to supply driving power, a second inverter configured to switch the driving power supplied by the second driving power supply unit and thereby drive the motor, and a second driving unit configured to drive the second inverter;
a third driving power supply unit configured to supply driving power, a third inverter configured to switch the driving power supplied by the third driving power supply unit and thereby drive the motor, and a third driving unit configured to drive the third inverter;
a fourth driving power supply unit configured to supply driving power, a fourth inverter configured to switch the driving power supplied by the fourth driving power supply unit and thereby drive the motor, and a fourth driving unit configured to drive the fourth inverter;
a first control unit configured to operate the driving motor by switching the first and second inverters through the first and second driving units; and
a second control unit configured to operate the driving motor by switching the third and fourth inverters through the third and fourth driving units,
wherein the first and second control units receive an operation state of the motor driving apparatus through communication between platforms, the first control unit controls the first and second driving units and controls any one or more of the third and fourth driving units, and the second control unit controls the third and fourth driving units and controls any one or more of the first and second driving units.

2. The apparatus of claim 1, wherein the communication between the platforms is controller area network (CAN) communication.

3. The apparatus of claim 1, wherein the driving motor comprises quadruple winding motors which are independently driven by the first to fourth inverters, respectively.

4. The apparatus of claim 1, wherein the first control unit controls any one or more of the third and third driving units when an abnormality occurs in the second control unit, and the second control unit controls any one or more of the first and second driving units when an abnormality occurs in the first control unit.

5. The apparatus of claim 1, wherein the first and second control units control any one or more of the first to fourth inverters through any one or more of the first to fourth driving units, such that each of the first to fourth inverters has an equal amount of power.

6. The apparatus of claim 1, wherein the first control unit shuts down the control over any one or more of the third and fourth driving units by the second control unit, when controlling any one or more of the third and fourth driving units.

7. The apparatus of claim 1, wherein the second control unit shuts down the control over any one or more of the first and second driving units by the first control unit, when controlling any one or more of the first and second driving units.

8. The apparatus of claim 1, wherein when an abnormality occurs in any one or more of the first to fourth driving power supply units, the first and second control units shut down the control over the inverter, that receives driving power from the driving power supply unit where the abnormality occurred, and raise the powers of the other inverters, through the first to fourth driving units.

9. The apparatus of claim 1, wherein when an abnormality occurs in any one or more of the first to fourth driving units, the first and second control units shut down the control over the driving unit where the abnormality occurred, and raise the powers of the inverters through the other driving units.

10. A control method of an apparatus for driving a motor of an MDPS, comprising:
receiving, by a first control unit and a second control unit, an operation state of the motor driving apparatus;
determining, from the operation state of the motor driving apparatus, whether an abnormality occurred in the motor driving apparatus;
shutting down, by the first and second control units, control over an inverter where the abnormality occurred, among a first inverter, a second inverter, a third inverter and a fourth inverter, in response to determining that the abnormality occurred;
after shutting down the inverter where the abnormality occurred, raising, by the first and second control units, powers of remaining inverters among the first to fourth inverters; wherein the first control unit controls a first driving unit and a second driving unit and controls any one or more of a third driving unit and a fourth driving unit, and the second control unit controls the third and fourth driving units and controls any one or more of the first and second driving units.

11. The control method of claim 10, further comprising controlling, by the first and second control units, the first to fourth inverters to have an equal amount of power, in response to determining that no abnormality occurred.

12. The control method of claim 10, wherein the first and second control units receive the operation state of the motor driving apparatus through communication between platforms.

13. The control method of claim 12, wherein the communication between the platforms is CAN communication.

14. The control method of claim 10, wherein the first control unit controls any one or more of the third and fourth driving units when an abnormality occurred in the second control unit, and the second control unit controls any one or more of the first and second driving units when an abnormality occurred in the first control unit.

15. The control method of claim 10, wherein the first control unit shuts down the control over any one or more of the third and fourth driving units by the second control unit, when controlling any one or more of the third and fourth driving units.

16. The control method of claim 10, wherein the second control unit shuts down the control over any one or more of the first and second driving units by the first control unit, when controlling any one or more of the first and second driving units.

17. The control method of claim 10, wherein in the shutting down of the control over the inverter where the abnormality occurred, when an abnormality occurred in any one or more of the first to fourth driving power supply units, the first and second control units shut down the control over the inverter, that receives driving power from the driving power supply unit where the abnormality occurred, among the first to fourth inverters, and raise the powers of the other inverters, through the first to fourth driving units.

18. The control method of claim 10, wherein in the shutting down of the control over the inverter where the abnormality occurred, when an abnormality occurred in any one or more of the first to fourth driving units to drive the first to fourth inverters, respectively, the first and second control units disable the driving unit where the abnormality occurred, and raise the powers of the inverters through the other driving units.

* * * * *